(12) United States Patent
Borrelli et al.

(10) Patent No.: US 6,549,706 B2
(45) Date of Patent: Apr. 15, 2003

(54) PHOTOINDUCED GRATING IN OXYNITRIDE GLASS

(75) Inventors: Nicholas Francis Borrelli, Elmira, NY (US); Thomas Allen Cook, Corning, NY (US); Evelyn McGee DeLiso, Corning, NY (US); Robert Adam Modavis, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 96 days.

(21) Appl. No.: 09/727,746

(22) Filed: Dec. 1, 2000

(65) Prior Publication Data

US 2001/0002941 A1 Jun. 7, 2001

Related U.S. Application Data

(63) Continuation-in-part of application No. 09/122,197, filed on Jul. 24, 1998, now Pat. No. 6,233,381
(60) Provisional application No. 60/053,863, filed on Jul. 25, 1997.

(51) Int. Cl.[7] .............................. G02B 6/34; G02B 6/18
(52) U.S. Cl. .......................................... 385/37; 385/124
(58) Field of Search .......................... 385/37, 123, 141, 385/142, 144, 124

(56) References Cited

U.S. PATENT DOCUMENTS

| | | | |
|---|---|---|---|
| 3,999,835 A | * 12/1976 | Newns et al. ................ 385/142 |
| 4,165,223 A | 8/1979 | Powers ............................ 65/2 |
| 4,203,744 A | 5/1980 | Schultz et al. ................ 65/3 A |
| 4,402,720 A | * 9/1983 | Edahiro et al. ................ 65/391 |
| 4,557,561 A | 12/1985 | Schneider et al. ........ 350/96.34 |
| 4,725,110 A | * 2/1988 | Glenn et al. .................... 359/3 |
| 4,807,950 A | 2/1989 | Glenn et al. ................ 350/3.61 |
| 5,152,819 A | 10/1992 | Blackwell et al. ............ 65/3.12 |
| 5,287,427 A | * 2/1994 | Atkins et al. ................ 385/124 |
| 5,416,863 A | * 5/1995 | Vengsarkar ................... 385/28 |
| 5,455,211 A | 10/1995 | McMillan et al. ............ 501/40 |
| 5,478,371 A | * 12/1995 | Lemaire et al. ................ 65/384 |
| 5,518,970 A | 5/1996 | McMillan et al. ............ 501/45 |
| 5,635,310 A | 6/1997 | Kudo et al. ............ 428/694 TS |

FOREIGN PATENT DOCUMENTS

| | | | |
|---|---|---|---|
| EP | 0 569 182 A1 | 11/1993 | ............ G02B/6/16 |
| EP | 0 622 343 A2 | 11/1994 | ............ C03C/21/00 |
| EP | 0 784 217 A1 | 7/1997 | ............ G02B/6/34 |
| JP | 63085023 A | 4/1988 | ............ C03B/20/00 |
| JP | 7244210 A | 9/1995 | ............ G02B/5/18 |
| RU | 2010775 | 4/1994 | ......... C03B/37/018 |
| WO | WO 94/00784 | 1/1994 | ............ G02B/6/16 |
| WO | WO 98/28643 | 6/1997 | ............ G02B/6/14 |
| WO | WO 97/23426 | 7/1997 | ............ C03C/21/00 |

OTHER PUBLICATIONS

Bruno, F. et al., *Plasma–enhanced chemical vapor deposition of low–loss SiON optical waveguides at 1.55–μm wavelength*, Applied Optics, vol. 30, No. 31, pp 4560–4564, 1991.

(List continued on next page.)

*Primary Examiner*—Hung Xuan Dang
*Assistant Examiner*—Mohammad Abutayeh
(74) *Attorney, Agent, or Firm*—Svetlana Z. Short; Kevin A. Oliver

(57) ABSTRACT

A length of oxynitride optical fiber is exposed to actinic radiation that is modulated by an interference technique to form a pattern of refractive index variations that functions as a reflective grating.

13 Claims, 3 Drawing Sheets

OTHER PUBLICATIONS

Bubnov et al., *Low–Loss Silicon Oxynitride Optical Fibres*, Proc. 21$^{st}$ Eur. Conf. on Opt. Comm. (EEOC '95–Brussels), pp. 329–332.

Bufetov et al., *Ultraviolet–light generation in nitrogen–doped silica fiber*, Optics letters, vol. 22, No. 18, Sep. 15, 1997, pp. 1394–1396.

Dianov et al., *Low–Hydrogen Silicon Oxynitride Optical Fibers Prepared by SPCVD*, Journal of Lightwave Technology, 1995, LT13, (7), pp. 1471–1474.

Dianov et al., *Highly Photosensitive Germanosilicate fibre Codoped with Nitrogen*, OSA Technical Digest, vol. 17 (1997), pp. 153–155.

Dianov et al., *Low–Loss nitrogen–doped silica fibers: the prospects for applications in radiation environments*, OFC '96 Technical Digest, pp. 61–62.

Dianov, et al., *Grating Formation in a Nitrogen–Doped–Silica–Core Fibre*, OFC 97, Feb. 16–21, 1997.

Dianov et al., *Nitrogen doped silica core fibres: A new type of radiation–resistant fibre*, Electronics Letters, 17$^{th}$ Aug. 1995, vol. 31, No. 17, pp. 1490–1491.

Dianov et al., *UV absorption and luminescence in silicon oxynitride prepared by hydrogen–free SPCVD–process*, Optical Materials 5 (Mar. 1996), pp. 169–173.

Juma, Salim, *Fibre gratings reinforce the bandwidth explosion*, OLE—Opto & Laser Europe, Oct. 1996.

Karpov et al., *Ultra–Thermostable Long–Period Gratings Induced in Nitrogen–Doped Silica Fiber*, Fiber Optics Research Center at the General Physica Institute of the Russian Academy of Sciences, 38 Vavilov St., Moscow 117942, Russia.

Kitagawa et al., OFC, vol. 4 of 1994 OSA Technical Digest Series, paper PD–17.

Storgaard–Larsen, T., *Nitrogen Doped Germania Glasses with Enhanced Optical and Mechanical Properties*, J. Electrochem. Soc., vol. 144, No. 6, Jun. 1997, pp. 2137–2142.

Storgaard–Larsen, T., *Opto–Mechanical Accelerometer based on Strain Sensing by a Bragg Grating in a Planar Waveguide*,Lyngby, Denmark: Mikroelektronik Centret 1996.

\* cited by examiner

PHOTOINDUCED GRATING IN OXYNITRIDE GLASS

RELATED APPLICATIONS

This application is a continuation-in-part of allowed application Ser. No. 09/122,197, filed Jul. 24, 1998 now U.S. Pat. No. 6,233,381, which claims priority of U.S. Provisional Application No. 60-053,863, filed Jul. 25, 1997. Both of which are hereby incorporated by reference.

BACKGROUND OF THE INVENTION

The present invention relates to the application of the photorefractive effect to the fabrication of optical devices based on oxynitride glass, and more particularly, to photoinduced Bragg gratings in oxynitride optical fibers.

Reflection gratings are often implemented as waveguides which have a path region having a modulated refractive index. The waveguiding structure is often in the form of a fiber. The modulation preferably takes the form of alternate regions of higher and lower refractive index. These periodic variations in refractive index act as a Bragg grating, and they selectively reflect light having a wavelength of twice the spacing. Such gratings can be used to filter, to define laser cavities and as components in multiplexers and demultiplexers.

Photoinduced Bragg gratings have been made in a variety of ways. One approach, which is disclosed in U.S. Pat. No. 4,725,110, is to direct two interfering beams of ultraviolet radiation through the cladding of an optical fiber to form an interference pattern along the germania-doped glass core. Other techniques involve subjecting regions of a fiber core to ultraviolet radiation through an amplitude mask or a phase mask. U.S. Pat. No. 5,287,427 teaches that the refractive index effect is enhanced by exposing that part of the glass that is to be subjected to actinic radiation to hydrogen or deuterium.

Germania-doped silica has shown the greatest refractive index change (Δn) after being subjected to actinic radiation. For various reasons attempts have been made to make gratings from photosensitive materials other than germania, a relatively scarce, expensive constituent. An object of the invention is to provide reflective gratings that are formed from commonly occurring, inexpensive materials. Another object of the invention is to provide a germania-free glass from which reflection gratings can be made.

Reflective gratings have been made from other UV sensitive oxides that are less effective than Germania. It is disclosed in WO 94/00784 that photoinduced gratings can be made from $B_2O_3$ in combination with $SiO_2$ or $GeO_2$. The publication, Kitagawa et al., OFC Vol. 4 of 1994 OSA Technical Digest Series, paper PD-17 teaches that gratings can be made by pulsing optical fibers having $P_2O_5$—$SiO_2$ cores with 193 nm radiation. U.S. Pat. No. 5,478,371 teaches a technique for forming gratings in $P_2O_5$ doped optical fiber with 248 nm radiation. Such photosensitive oxides can be used alone or in combination with other photosensitive oxides such as Germania. A further object of the invention is to provide a photosensitive material that can be used in combination with other photosensitive materials to form reflection gratings.

SUMMARY OF THE INVENTION

Briefly, the present invention relates to an optical device comprising a nitrogen-doped silica glass region having a pattern of photo-altered refractive index variations. The pattern of refractive index variations preferably takes the form of alternate regions of higher and lower refractive index, the period of which is such that the pattern constitutes a reflection grating. The nitrogen-doped silica glass region can be the core region of an optical waveguide, the core region being at least partially surrounded by a cladding, the optical waveguide comprising a portion wherein the core region has a refractive index that varies in a longitudinal direction, the index varying such that the portion of the waveguide reflects radiation of a predetermined wavelength propagating longitudinally in the waveguide. The optical waveguide can be an optical fiber or a planar device.

The present invention also relates to a method of making an optical component. The method comprises (a) providing a body at least a portion of which comprises silicon oxynitride glass, and (b) exposing at least a part of the portion to actinic radiation such that the refractive index of the exposed part is changed. The change in refractive index of the irradiated region is enhanced by impregnating the irradiated region with an atmosphere comprising hydrogen or deuterium. To make a reflective grating, the irradiated region is exposed to a modulated intensity of actinic radiation whereby the refractive index thereof is modulated to reproduce the intensity pattern of the radiation.

DESCRIPTION OF THE PREFERRED EMBODIMENTS

The present invention relates to an optical device comprising a region of silicon oxynitride glass exhibiting a photorefractive effect resulting from the alteration of the refractive index of the glass region resulting from exposing it to at least one beam of actinic radiation for sufficient time to increase the refractive index of that portion of the glass region upon which the beam impinges. The oxynitride glass device is formed by conventional techniques. Silicon oxynitride planar waveguides are usually synthesized by plasma and nonplasma CVD processes, e.g. see F. Bruno et al. "Plasma-enhanced chemical vapor deposition of low-loss SiON optical waveguides at 1.55 m wavelength", Applied Optics, vol. 30, pp. 4560–4564, 1991. Nitrogen doped optical fibers have been drawn from preforms synthesized by reduced-pressure plasmachemical deposition (SPCVD), see, eg. E. M. Dianov et al. "Low-Hydrogen Silicon Oxynitride Optical fibers Prepared by SPCVD", Journal of Lightwave Technology, 1995 LT13, (7), pp. 1471–1474. Such a SPCVD process may result in trace amounts of chlorine (less than 1 atomic %).

Figure 1:
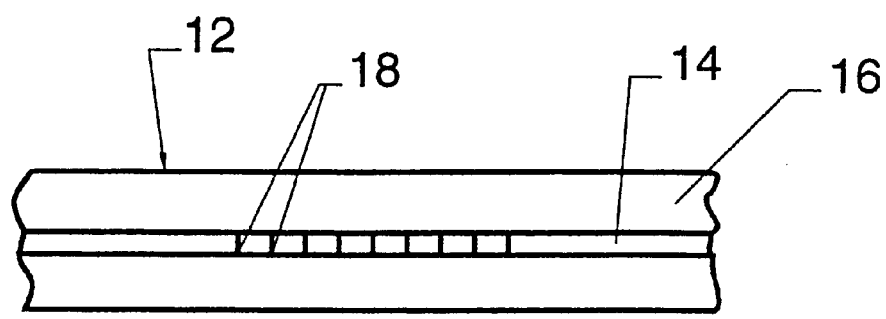
FIG. 1 schematically illustrates an optical fiber having a grating pattern in its core.
Figure 2:
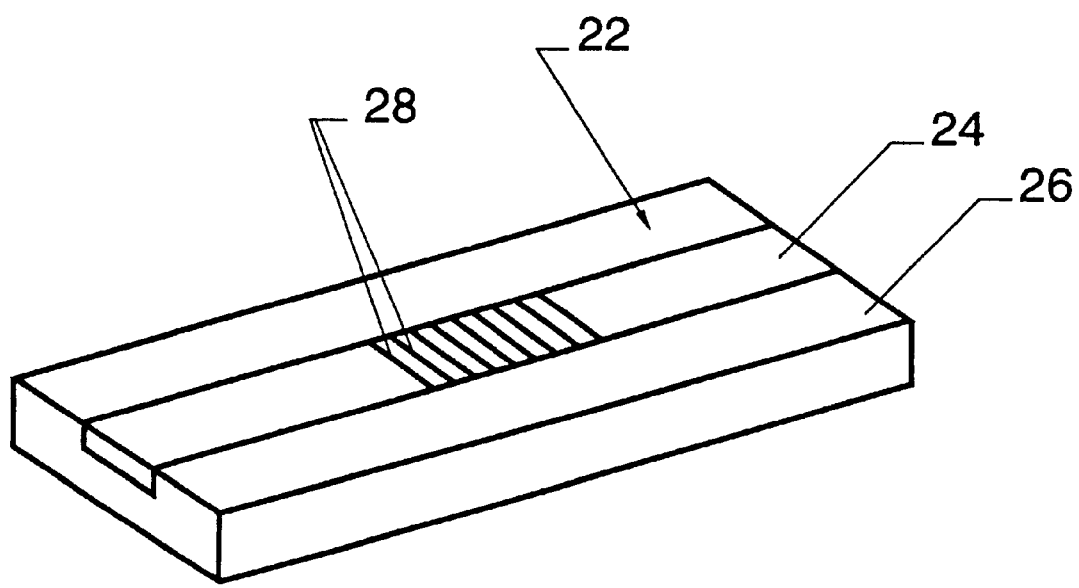
FIG. 2 schematically illustrates a planar optical waveguide having a grating pattern in its core.

FIG. 1 shows an optical fiber 12 having a silicon oxynitride core 14 and a silica cladding 16. The core 14 contains a Bragg reflection grating 18 written therein by application of actinic radiation having a linear sequence of intensity peaks. A Bragg reflection grating can similarly be written into the core of a planar waveguide as shown in FIG. 2 wherein planar waveguide 22 includes a core 24 in the surface of substrate 26. Core 24 includes a pattern 28 of refractive index variations that function as a Bragg grating.

EXAMPLE 1

This example illustrates that a grating can be formed in an oxynitride optical fiber without impregnating it with hydrogen.

The optical fiber employed in this example had a core diameter of about 2 $\mu$m and an outside diameter of about 124 $\mu$m. The composition of the core was silica doped with 3.15 atomic percent nitrogen, and the cladding consisted of silica, whereby the value of $\Delta n$ was about 0.042.

A grating was formed in the oxynitride optical fiber using a KrF excimer laser operating at a wavelength of 248 nm and a Lasiris uniform phase mask ($\Lambda$=1069 nm). The exposure was 10 minutes at 10 Hz with a fluence of about 120 mJ/cm$^2$/pulse. The grating length was 19 nm, and the peak reflectivity was about 0.1%. Therefore, the total index change (assuming perfect fringe contrast) was about $1.5 \times 10^{-6}$.

Figure 3:
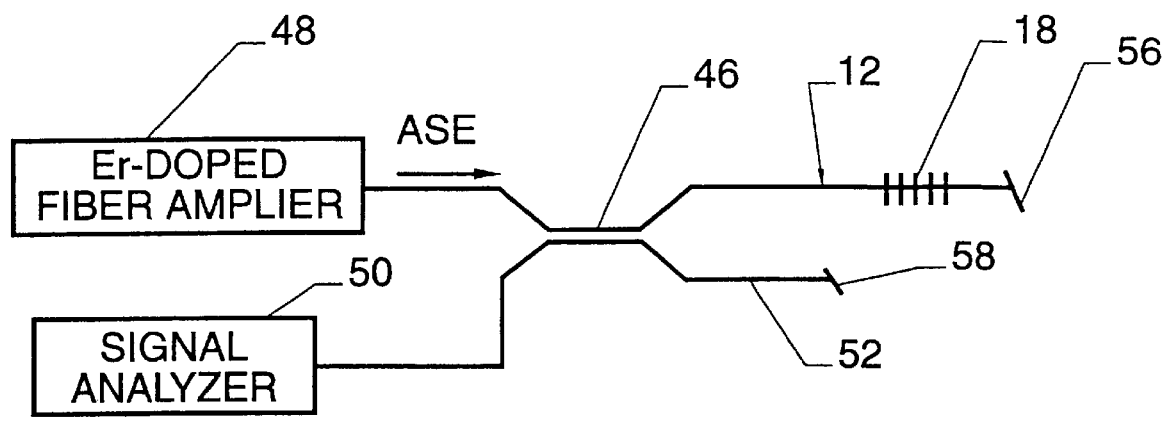
FIG. 3 is a schematic diagram of a reflectivity measuring optical circuit.
Figure 4:
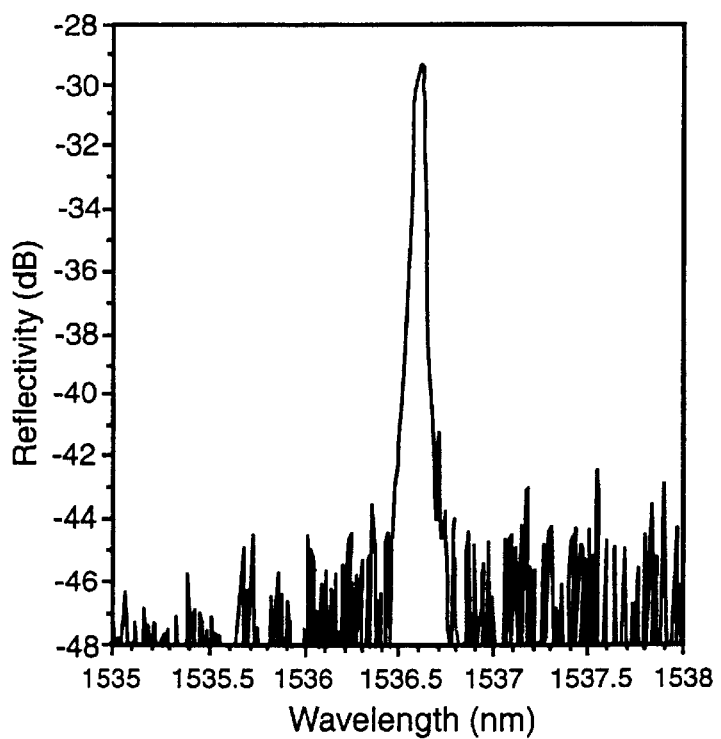
FIGS. 4 and 5 are graphs of reflectivity plotted as a function of wavelength for the reflective gratings in an oxynitride optical fibers of Examples 1 and 2.

The circuit of FIG. 3 was employed to analyze the reflectivity of the resultant grating. The oxynitride fiber 12 having grating 18 was fused to an output pigtail of 3 dB coupler 46. An Er-doped fiber amplifier 48 and an optical signal analyzer 50 were respectively connected to the two input pigtails of coupler 46. The end of oxynitride fiber 12 and the remaining coupler output pigtail 52 were provided with antireflection terminations 56 and 58, respectively. Coupler 46 coupled a portion of the amplified spontaneous emission from fiber amplifier 48 to fiber 12. A portion of the signal that reflected from grating 18 was coupled to optical signal analyzer 50. As shown in FIG. 4, the reflected signal is centered about 1536.6 nm.

EXAMPLE 2

A grating was formed in an oxynitride optical fiber 12 by the following method. The optical fiber was made by the SPCVD process described in the E. M. Dianov et al publication. The core diameter and outside diameter of the fiber were about 8 $\mu$m and 125 $\mu$m, respectively. The composition of the core 12 was silica doped with 0.9 atomic percent nitrogen, and the cladding 16 consisted of silica.

The fiber was subjected to hydrogen loading to increase the refractive index change in accordance with the teachings of U.S. Pat. No. 5,287,427, which is incorporated herein by reference. The hydrogen loading was done at room temperature at 100 atmospheres pressure.

The fiber was then exposed to an interference pattern in a side exposure geometry in accordance with the teachings of U.S. Pat. Nos. 4,725,110 and 4,807,950, which are incorporated herein by reference. The beam was derived from an excimerpumped frequency doubled dye laser. The grating as written using a 10 minute exposure at 240 nm at a pulse rate of 10 Hz. The energy density is estimated to be 0.1 to 0.2 Joules per cm$^2$.

Figure 5:
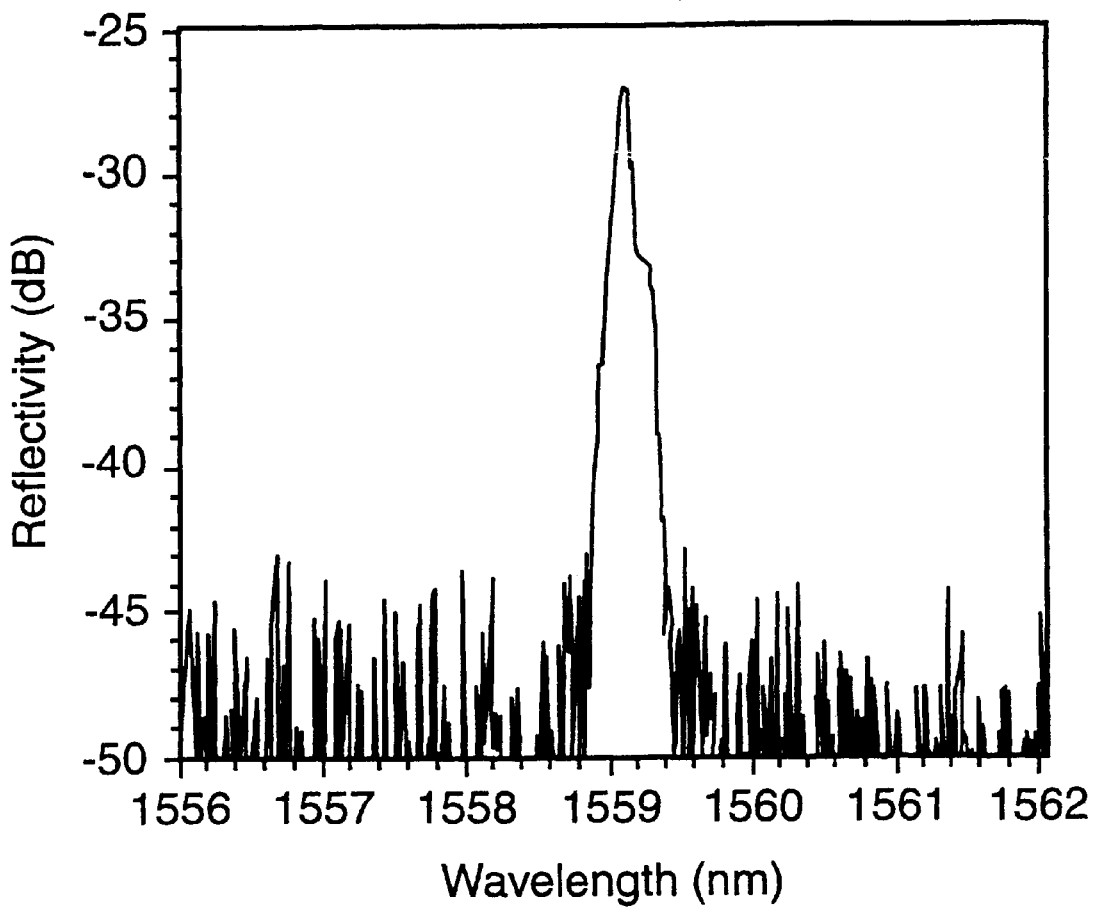

The reflectivity of the grating produced in accordance with Example 2 was analyzed in the circuit of FIG. 3. As shown in FIG. 5, the reflectivity obtained from FIG. is about 0.2%, which corresponds to a refractive index change of $\Delta n=4.5 \times 10^{-6}$ in grating 18 as compared with the unmodified refractive index of core 14.

The reflectivity of gratings formed by the above-described methods can be changed by modifying various parameters. The hydrogen concentration in the fiber during UV exposure could be increased to an extent that reflectivity is increased by about 3–4 times that achieved in Example 2. Furthermore, a higher exposure could be employed to increase reflectivity; both peak fluence and total dose could be increased. Moreover, a shorter wavelength exposure, e.g. 215 nm exposure, might improve reflectivity; this is the case for the Si—O—P bond in the SiO$_2$—P$_2$O$_5$ system. Approximately 0.1 to 10 atomic percent nitrogen is a preferred range of the nitrogen doped silica glass, with about 0.5 to 4 atomic percent nitrogen more preferred, and about 0.8 to 3.25 atomic percent nitrogen most preferred.

We claim:

1. An optical device comprising:
   a nitrogen doped silica glass region having a pattern of photo-altered refractive index variations, wherein said glass region consists essentially of hydrogen loaded nitrogen-doped silica, where the pattern of refractive index variations takes the form of alternate regions of higher and lower refractive index, the period of which is such that said pattern constitutes a reflection grating, and where the glass region is the core region of an optical waveguide, the core region being at least partially surrounded by a cladding, the optical waveguide comprising a portion wherein said core region has a refractive index that varies in a longitudinal direction, the index varying such that the portion of the waveguide reflects radiation of a predetermined wavelength propagating longitudinally in the waveguide.

2. An optical device according to claim 1 wherein said glass region is germanium-free.

3. An optical device according to claim 1 wherein said nitrogen doped silica glass is comprised of about 0.1 to 10 atomic percent nitrogen.

4. An optical device according to claim 1 wherein said nitrogen doped silica glass is comprised of about 0.5 to 4 atomic percent nitrogen.

5. An optical device according to claim 1 wherein said glass region consists essentially of nitrogen and SiO$_2$.

6. An optical device according to claim 1 wherein said glass region consists essentially of Si, N, O.

7. An optical device according to claim 1 wherein said glass region consists essentially of Si, N, O, and at least one member of the group consisting of hydrogen and deuterium.

8. An optical device according to claim 1 wherein said glass region includes trace amounts of chlorine.

9. An optical device according to claim 1 wherein said optical waveguide is an optical fiber.

10. An optical device according to claim 1 wherein said optical waveguide is a planar optical waveguide.

11. An optical device comprising a region of hydrogen loaded silicon oxynitride glass exhibiting a photorefractive effect resulting from alteration of the refractive index of said glass region by exposure of said glass to at least one beam of actinic radiation for sufficient time to increase the refractive index of that portion of said glass region upon which said beam impinges, the refractive index having variations in the form of alternate regions of higher and lower refractive index, the period of which is such that said pattern constitutes a reflection grating, and where the glass region is the core region of an optical waveguide, the core region being at least partially surrounded by a cladding, the optical waveguide comprising a portion wherein said core region has a refractive index that varies in a longitudinal direction, the index varying such that the portion of the waveguide reflects radiation of a predetermined wavelength propagating longitudinally in the waveguide.

12. An optical device according to claim 11 wherein said device is an optical waveguide having a light conducting core region, said region of silicon oxynitride glass constituting said core region.

13. An optical device according to claim 12 wherein said beam of actinic radiation includes a linear sequence of spaced intensity peaks, whereby said core region includes a Bragg grating.

* * * * *